Patented June 18, 1940

2,205,180

UNITED STATES PATENT OFFICE 2,205,180

METHOD OF TEMPERING GLASS ARTICLES

William W. Shaver, Corning, N. Y., assignor to Corning Glass Works, Corning, N. Y., a corporation of New York No Drawing. Application September 24, 1935, Serial No. 41,931

12 Claims. (Cl. 49—89)

This invention relates to glass and more particularly to a method of tempering or case hardening glass articles.

Present and past methods used for the case hardening of glass articles by first heating them to an elevated temperature, then plunging the heated articles into a liquid bath comprising oil, waxes, resins, or the like, heated to a lower temperature or subjecting the heated articles to air blasts or any other means for rapid cooling, do not, in general, produce a uniform and satisfactory case hardening of the article over its entire surface without introducing an objectionable or even serious amount of warping. The use of molten metals or alloys as glass tempering media is particularly liable to cause warpage on account of the great difference in specific gravity between the metal and the glass. Heated oil and like organic media are relatively unstable at the temperatures most useful for tempering glass, and because the most useful temperatures are near or above the flash point of the oil, a fire hazard is introduced into the process. Moreover, the carbonization and other effects of high temperatures on oil change the thermal transfer condition between the bath and the heated glass article with the result that methods employing oils and the like organic media have definite limitations. Past methods, also, in the case of certain glasses have resulted in a lack of chemical stability of the surface after the chilling operation and the surface appearance also at times is seriously affected.

The object of this invention is a method of tempering or case-hardening glass articles which will produce a uniform and definite degree of temper without danger of warpage of the articles nor serious effect upon the surface stability thereof and without introducing any fire hazard.

The above and other objects may be accomplished by employing my invention which embodies among its features heating and/or quenching the glass article in a glass tempering bath composed of a molten inorganic salt or salts the density or specific gravity of which is substantially the same as that of the glass which is to be tempered.

Another feature of my invention comprises heating the article which is to be tempered in a bath of molten inorganic salt or salts and chilling the glass in a bath which will dissolve the constituents of the heating bath.

Other objects and features will become apparent as the description proceeds.

In practicing my invention I first heat the glass article which is to be tempered to a temperature slightly below the softening temperature of the glass by immersing it in a bath of molten inorganic salt or mixture of salts the selection of which depends upon various considerations as will later appear. After the article has become uniformly heated to the desired temperature, I remove it from the heating bath and immediately plunge it and completely immerse it into a cooling bath which is heated to a lower temperature depending upon the kind of glass and the degree of temper desired, and which preferably is composed of a mixture of molten inorganic salts having essential properties, as will appear, but which under certain circumstances may comprise heated oil or other prior liquid cooling baths. The chilling step may even comprise subjecting the heated article to an air blast in known manner, the novel feature in this instance residing in the method of heating the article uniformly to a high temperature without warpage and loss of surface stability. Alternatively, the heating step may comprise heating the article in a muffle or open air furnace to be followed by chilling or quenching the article in a bath of molten inorganic salts as above described.

To illustrate the preferred embodiment of my invention, I give the following example of my method as applied to the glass $B_2$ of the Sullivan and Taylor Patent 1,304,623, issued May 27, 1919. This glass has a softening temperature of about 813° C. A slab of this glass having a width of 1¼ inches, a thickness of $\frac{1}{16}$ inches and a length of 7 inches was heated by immersing it for two minutes in a molten mixture comprising about 67% of sodium sulfate and 33% of potassium chloride by weight and containing a small amount of tungstic oxide, the latter of which was added at intervals to keep the bath non-alkaline. The molten bath was maintained at a temperature of 800° C. and had a density of about 1.9 as compared to about 2.3 for the glass. After being heated for two minutes, which sufficed to bring the glass to uniform temperature, the slab was removed and immediately quenched in a molten bath comprising about 44% of sodium nitrite and 56% of potassium nitrate by weight heated to 150° C.

Subsequent measurements of the tempered glass slab showed that it had suffered no distortion exceeding a very few thousandths of an inch. The mechanical strength of the tempered slab was shown by impact tests to be very appreciably greater than that of other slabs which had the same dimensions and which were tempered by heating in an ordinary atmospheric furnace and chilled in a bath of 600W oil heated to 150° C. Incidentally appreciable warpage was encountered in the latter case, due to the slabs having been heated in an open furnace in accordance with the common method of heating.

As a special feature of the above described method, the following is to be noted. The chilling bath, which consists of a molten mixture of potassium nitrate and sodium nitrite readily dissolves and removes from the heated glass article the residual salts which adhere to it when it is removed from the heating bath preparatory to quenching it, thereby cleaning the glass and exposing it practically instantaneously to the cooling action of the chilling bath. Briefly, this is explained as follows: Potassium nitrate melts at approximately 335° C. and will dissolve sodium nitrite at that temperature in all proportions. The eutectic mixture of these two salts melts at about 141° C. These salts, when molten, will also dissolve at 150° C. a small percentage of sodium chloride, potassium chloride, sodium sulfate and others, the percentage of which is thus dissolvable increasing with increased temperature. Hence, when the glass which is being treated is removed from the heating bath with a layer of the salt from the heating bath adhering to it, this layer of salt becomes dissolved into the potassium nitrate-sodium nitrite chilling bath.

Another feature of my method which has outstanding importance is the fact that due to some property of molten inorganic salts the temperature of the chilling bath accurately determines the degree of temper which will be obtained. That is to say, the final stress which will be obtained by quenching a given glass heated to a given temperature into a molten salt chilling bath will vary inversely as the temperature of the chilling bath. The degree of temper which is obtained under the same conditions by using an oil chilling bath is practically independent of the temperature of the chilling bath and hence such a bath has a very limited use.

In tempering articles made of glass other than the glass above referred to, such as, for example, ordinary lime glass which has a softening temperature in the neighborhood of 700° C., it is necesary to employ lower temperatures in the heating bath in order not to heat the glass above its softening point. My method is applicable to all kinds of glass and to a great variety of shapes of ware.

The successful practice of my invention depends largely upon the following considerations:

1. The salt or combination of salts for the heating bath must melt and remain molten at a temperature below that to which the glass articles must be heated prior to chilling.

2. The molten salt bath and particularly the heating bath which operates at the higher temperature must not attack the glass which is immersed in it in the time which is required to bring the glass to the desired temperature.

3. The density of the heating bath should be sufficiently near to that of the glass to permit the bath to act as a support to prevent the glass article from warping.

Other minor requirements, but nevertheless desirable properties of my improved baths, are as follows:

a. The vapor pressure of the salts employed should be low enough to avoid excessive evaporation at the temperatures employed.

b. The salts which comprise the heating bath and which necessarily adhere to the glass when it is withdrawn therefrom should not react too violently with the medium which is used for chilling.

c. The baths should be non-poisonous and the fumes should be non-injurious to health.

The following is a list of salts and mixtures of salts which I have found will fulfill the above requirements and which have successfully been used as heating baths: sodium chloride, potassium chloride, sodium chloride and potassium chloride mixed in equal parts by weight, sodium sulfate and sodium chloride (2 to 1 by weight), sodium bromide, potassium bromide, sodium bromide and potassium bromide mixed, sodium bromide and sodium sulfate mixed, potassium sulfate and sodium chloride mixed, cuprous chloride, cuprous chloride and potassium chloride mixed, sodium chloride and potassium chloride and strontium chloride mixed, sodium dihydrogen phosphate, sodium tungstate combined with alkali chlorides or bromides, etc. Obviously many other combinations of the above recited components may be found suitable. Since the softening points and specific gravities of different glasses vary widely, it is impossible to state the proportions of any of the above recited baths which will be suitable for all glasses, but for any individual glass the proper proportions can easily be determined by trial. It will further be apparent that some of the above recited heating bath compositions may also be found suitable for use as cooling baths.

Some salt mixtures which I have found to be particularly suitable as chilling baths both as regards wide range of temperature of operation and economy are as follows: sodium nitrate and potassium nitrate mixed, sodium nitrite and potassium nitrate mixed, sodium nitrate alone, potassium nitrate alone, ammonium acid sulfate, lithium nitrate and sodium nitrate and potassium nitrate and potassium nitrite mixed, potassium chloride and cuprous chloride mixed, zinc chloride alone, potassium chloride and zinc chloride mixed, potassium acid sulfate, sodium acid sulfate, sodium acid sulfate and potassium acid sulfate and others. It will be apparent that various combinations of the above named salts other than those mentioned above may also be used.

Most metal salts decompose to some extent at least when heated to high temperatures. Since in the case of the nitrates of the alkali metals such decomposition becomes appreciable at temperatures in the neighborhood of 525° C. and above, there is a tendency for the molten salt bath to become alkaline when used for tempering glasses which require the heating of the bath to this range of temperatures. Such alkalinity, which presumably is due to decomposition of the bath and formation of alkali metal oxide, causes attack and corrosion of the glass surface. I have found that the alkalinity of the molten salt baths can be neutralized and the corrosion of the glass surfaces prevented by adding to the molten bath a small amount of a substance which will form therein an acid radical. Such substance may comprise an oxide of acidic character per se such as tungstic oxide, $WO_3$, or silica, $SiO_2$, or boric oxide, $B_2O_3$, or it may comprise a salt of a strong acid and a weak base such as calcium sulphate, $CaSO_4$, or magnesium sulphate, $MgSO_4$, ammonium sulphate, $(NH_4)_2SO_4$, which on decomposition will be predominantly acid through the liberation of a strong acid radical. The ammonium salts should not be used in molten baths which contain nitrates on account of the possibility of explosion. Such additions for the neutralization of the alkalinity of the bath are preferably made from time to time as required in amounts which usually need not be more than twice the amount calculated to correct exactly the known alkalinity of the bath. In the case of a bath composed of sodium chloride and potassium chloride, it was found that the introduction of sand or about .25% of boric oxide resulted in a better surface stability in the case of the above mentioned glass $B_2$ of the Sullivan and Taylor patent than was obtained without the addition of one or the other of these oxides.

I have further found that certain substances, when added in substantial amounts to a molten salt chilling bath, will materially reduce the chilling power of the bath, i. e., its ability to absorb heat from the highly heated glass placed therein. Such a reduction in the chilling power of the bath results in an increase in the operating efficiency of the bath in a marked degree in that it permits lowering the temperature of the bath at which a desired degree of temper in the glass article may be obtained by immersion therein with a resultant saving in fuel. That is to say, in a bath so treated the actual temperature thereof may be maintained as much as 100° C. lower than that required when these substances are not present. In other words, the actual temperature of the bath may be lowered as much as 100° C. and the degree of temper which will be introduced into a heated glass article by its immersion therein will be substantially the same as it would be if these substances were omitted and the bath were held at its normal temperature. The substances which I have found to produce this effect must fulfill the following requirements. They must be finely divided and capable of being kept in suspension in the molten bath and they must be inert with respect to the glass. Substances which I have found to be particularly suitable are calcium sulphate, ($CaSO_4$), alumina, ($Al_2O_3$), silica, ($SiO_2$), magnesia, ($MgO$), Kaolin, felspar and the like. The above named substances are all inert with respect to the glass and do not melt except at temperatures much higher than those here employed but it will be noted that some of them such as calcium sulphate and silica may also serve to neutralize the alkalinity of the bath. However, in the present instance the amounts used are greater than when neutralization of alkalinity alone is desired and may amount to as much as 5% of the bath. It is further to be noted that substances added to the molten salt bath either for the purpose of neutralizing its alkalinity or for increasing its efficiency by a lowering of its effective temperature both have a modifying effect on the bath with respect to its action on the glass which is to be tempered therein.

This application is a continuation in part of my pending application Serial Number 34,107, filed July 31, 1935.

I claim:

1. The method of case hardening glassware which includes heating the glass in a molten bath and suddenly chilling the glass in a bath which will dissolve the constituents of the heating bath.

2. The method of tempering glass which includes heating the glass in a molten salt bath to a temperature between its strain and softening point and suddenly chilling the glass in a bath containing a mixture of potassium nitrate and sodium nitrite.

3. The method of tempering glass which includes heating the glass in a molten salt bath to a temperature between its strain and softening point and suddenly chilling the glass in a bath containing a mixture of a nitrate and a nitrite of at least two alkaline metals.

4. The method of tempering glass which includes heating the glass to a temperature between its strain and softening point and suddenly chilling it in a molten bath consisting of a mixture of potassium nitrate and sodium nitrate.

5. The method of tempering glass which includes heating the glass to a temperature between its strain and softening point and chilling it in a molten bath of sodium nitrate and potassium nitrate which contains in suspension finely divided calcium sulfate.

6. The method of tempering glass, which includes heating the glass to a temperature between its strain and softening points and suddenly chilling it in a bath of molten salts maintained at a temperature at which the salts will become alkaline through decomposition and containing in suspension a finely divided unmolten material which will neutralize the alkalinity.

7. The method of tempering glass, which includes heating the glass to a temperature between its strain and softening points and suddenly chilling it in a bath of molten salts maintained at a temperature below that which ordinarily would produce the desired amount of stress in the glass and containing in suspension a substantial amount of a finely divided unmolten material which will cause the bath to produce the desired amount of stress.

8. The method of reducing the amount of stress developed in a glass article by chilling it suddenly in a molten salt bath, which includes introducing into the bath a suspended, finely divided, unmolten material which will reduce the chilling power of the bath.

9. In a method of tempering glass, the steps of melting a salt which tends to become alkaline on decomposition to form a bath, maintaining said salt bath at a temperature at which it will tend to decompose, maintaining in suspension in said bath a finely divided substance which will remain solid at the temperature of the bath and will neutralize the alkalinity of the bath, and immersing the glass in said bath.

10. In a method of tempering glass, the steps of melting a salt which tends to become alkaline on decomposition to form a bath, maintaining said salt bath at a temperature at which it will tend to decompose, maintaining in suspension in said bath a finely divided substance which will remain solid at the temperature of the bath and will neutralize the alkalinity of the bath, uniformly heating the glass by immersing it in said bath and suddenly chilling the glass.

11. A substantially anhydrous fluid treating bath for glassware comprising a molten salt of an alkali metal and a finely divided unmolten material dispersed thru the salt which will react with free alkali to prevent the bath from becoming alkaline.

12. A glass tempering medium comprising a molten bath consisting of sodium nitrate and potassium nitrate which contains calcium sulphate.

WILLIAM W. SHAVER.